(12) United States Patent
Li

(10) Patent No.: US 6,672,896 B1
(45) Date of Patent: Jan. 6, 2004

(54) BUILT-IN KVM SWITCH

(75) Inventor: How-Chin Li, Taipei (TW)

(73) Assignee: Power Communication Tech. Co., Ltd., Taipei (TW)

( * ) Notice: Subject to any disclaimer, the term of this patent is extended or adjusted under 35 U.S.C. 154(b) by 0 days.

(21) Appl. No.: 10/342,244

(22) Filed: Jan. 15, 2003

(51) Int. Cl.⁷ .............................................. H01R 11/00
(52) U.S. Cl. ....................................................... 439/502
(58) Field of Search ............................... 439/498, 502, 439/505; 710/38; 345/163

(56) References Cited

U.S. PATENT DOCUMENTS

| | | | | |
|---|---|---|---|---|
| 5,721,842 A | * | 2/1998 | Beasley et al. | 709/204 |
| 5,937,176 A | * | 8/1999 | Beasley et al. | 710/317 |
| 6,112,264 A | * | 8/2000 | Beasley et al. | 710/38 |
| 6,231,379 B1 | * | 5/2001 | Shen | 439/505 |
| 6,256,014 B1 | * | 7/2001 | Thomas et al. | 345/163 |
| 6,280,243 B1 | * | 8/2001 | Liu et al. | 439/502 |
| 6,345,323 B1 | * | 2/2002 | Beasley et al. | 710/38 |
| 6,356,793 B1 | * | 3/2002 | Martin | 700/19 |
| 6,378,014 B1 | * | 4/2002 | Shirley | 710/100 |
| 6,388,658 B1 | * | 5/2002 | Ahern et al. | 345/168 |
| 6,554,639 B2 | * | 4/2003 | Doriski, Jr. | 439/498 |
| 6,557,170 B1 | * | 4/2003 | Wilder et al. | 725/130 |
| 6,567,869 B2 | * | 5/2003 | Shirley | 710/62 |
| 6,615,272 B1 | * | 9/2003 | Ambrose | 709/238 |

* cited by examiner

Primary Examiner—Ross Gushi
(74) Attorney, Agent, or Firm—Troxell Law Office PLLC

(57) ABSTRACT

A built-in KVM switch: comprising: a card; a fixing support, fixedly coupled to one side of the card and having at least one opening, inserted into an augmentation socket in a host; at least one connector, disposed in the opening on the fixing support; at least one connecting wire corresponding to the connector connected to the connecting wire at one end; and a logic control unit, disposed on the card so as to process a signal from the connector.

7 Claims, 5 Drawing Sheets

BUILT-IN KVM SWITCH

BACKGROUND OF THE INVENTION

1. Field of the Invention

The present invention generally relates to a built-in KVM (keyboard, video, and mouse) switch and, more particularly, to a built-in KVM switch fixedly coupled to an augmentation socket in a host.

2. Description of the Prior Art

Recently, with the rapid development in information technology, computers have been widely used in various applications. On the other hand, there have been provided more and more computer peripherals such as printers, scanners, allocators, tablets, modems, CD-ROM burners, multi-function products (MFPs), etc. Home-use computers or office-use ones, they are provided with more or less external peripherals. Therefore, it is very often that a user may have to operate more than one computer. Meanwhile, in order to minimize the space for the keyboards, the mice and the monitors, a KVM switch is needed. A conventional KVM switch, as shown in FIG. 1, is generally an external type, in which at least three KVM connector sets are arranged on the housing A. Each KVM connector, set comprises a connector for the keyboard B, a connector for the video display C and a connector for the mouse D. As a result, a large number of various connectors make the connecting wires messy.

Accordingly, there is need in providing a built-in KVM switch that can be fixedly coupled to an augmentation socket in a host.

SUMMARY OF THE INVENTION

In view of the aforementioned issue, it is the primary object of tile present invention to provide a built-in KVM switch fixedly coupled to an augmentation socket in a host so as to reduce the space and the amount of connectors required for peripherals.

It is another object of the present invention to provide a built-in KVM switch fixedly coupled to an augmentation socket in a host so as to overcome the problem that the connecting wires are arranged messy.

In order to achieve the above object, the present invention provides a built-in KVM switch: comprising: a card; a fixing support, fixedly coupled to one side of the card and having at least one opening, inserted into an augmentation socket in a host; at least one connector, disposed in the opening on the fixing support; at least one connecting wire corresponding to the connector connected to the connecting wire at one end; and a logic control unit, disposed on the card so as to process a signal from the connector.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, is together with the description, serve to explain the principles of the invention in general terms.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

The present invention providing a built-in KVM switch can be exemplified by the preferred embodiments as described hereinafter.

Figure 2:
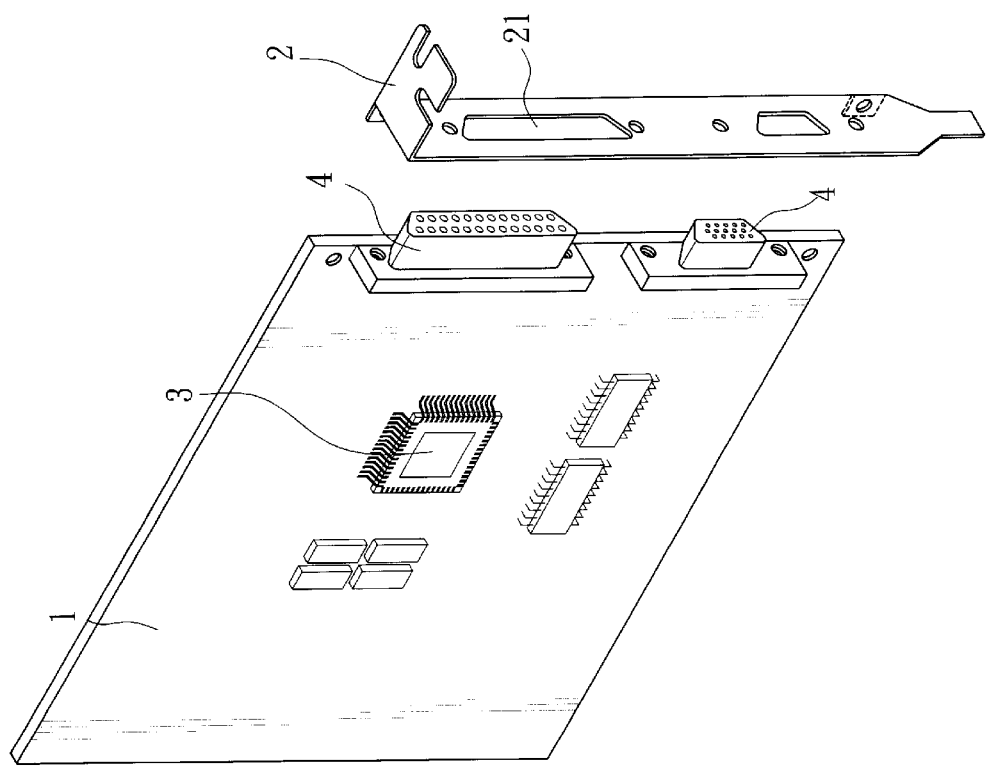
FIG. 2 is an exploded view showing a card and a fixing support.
Figure 3:
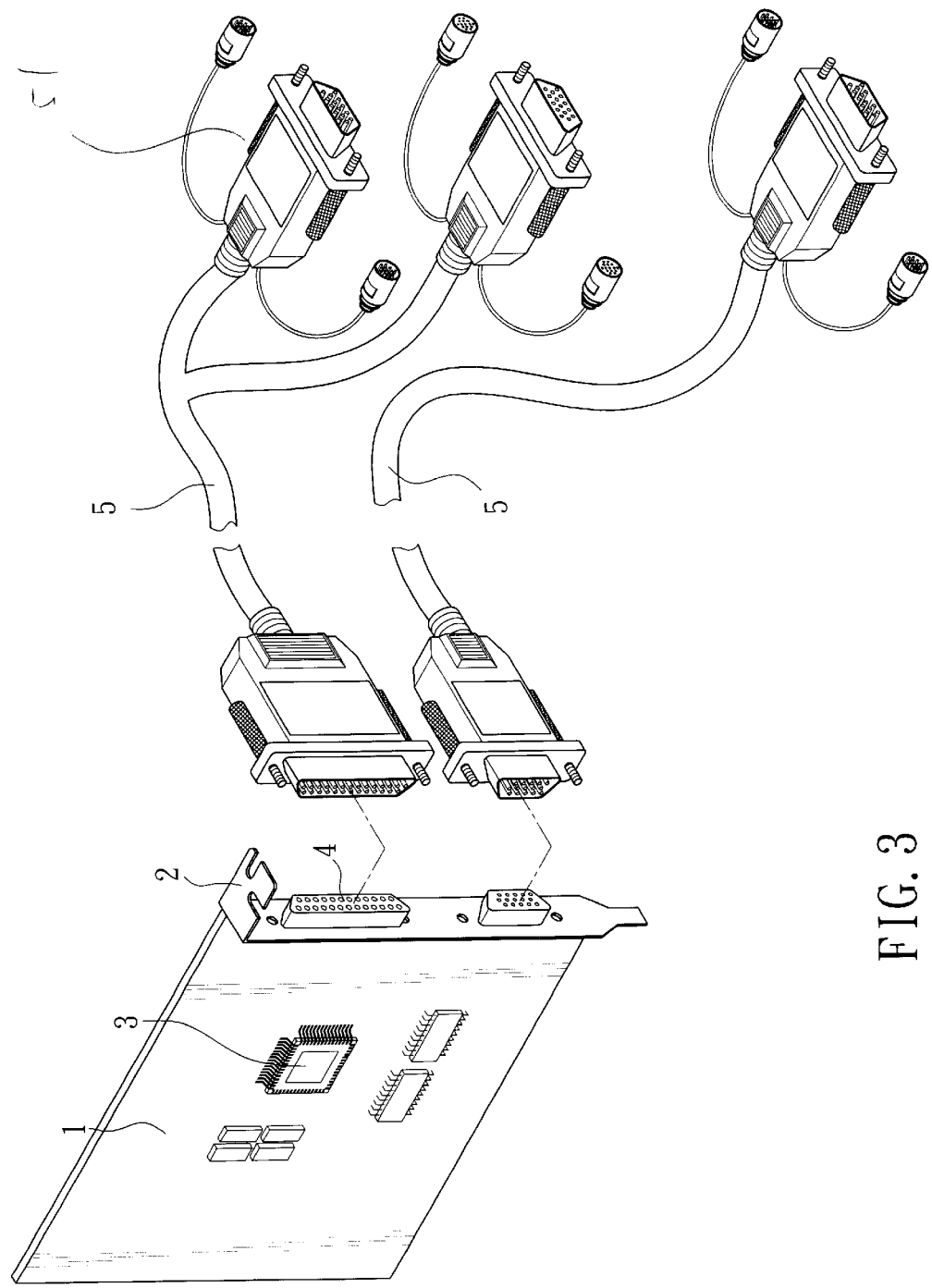
FIG. 3 is a perspective view showing a built-in KVM switch according to the present invention.

Please refer to FIG. 2 and FIG. 3, which are, respectively, an exploded view showing a card and a fixing support and a perspective view showing a built-in KVM switch according to the present invention. The built-in KVM switch of the present invention comprises: a card 1; a fixing support 2; a logic control unit 3; at least one connector 4; and at least one connecting wire 5 corresponding to the connector 4. The logic control unit 3 and the connector 4 are disposed on the card 1. The fixing support 2 (L-shaped in this case) is the same as those used for the interface cards in a general personal computer and is inserted into an augmentation socket (not shown) in a host. On the fixing support 2 are disposed at least one opening 21 for the connector 4. On side of the card 1 is fixedly coupled to the fixing support 2. The logic control unit 3 processes the signals from the connector 4. Furthermore, the connecting wire 5 is connected to the connector 4 at one end, while the connecting wire 5, at the other end, is branched into three connectors/plug 51 to be connected to a mouse, a keyboard and a video display, respectively.

Figure 1:
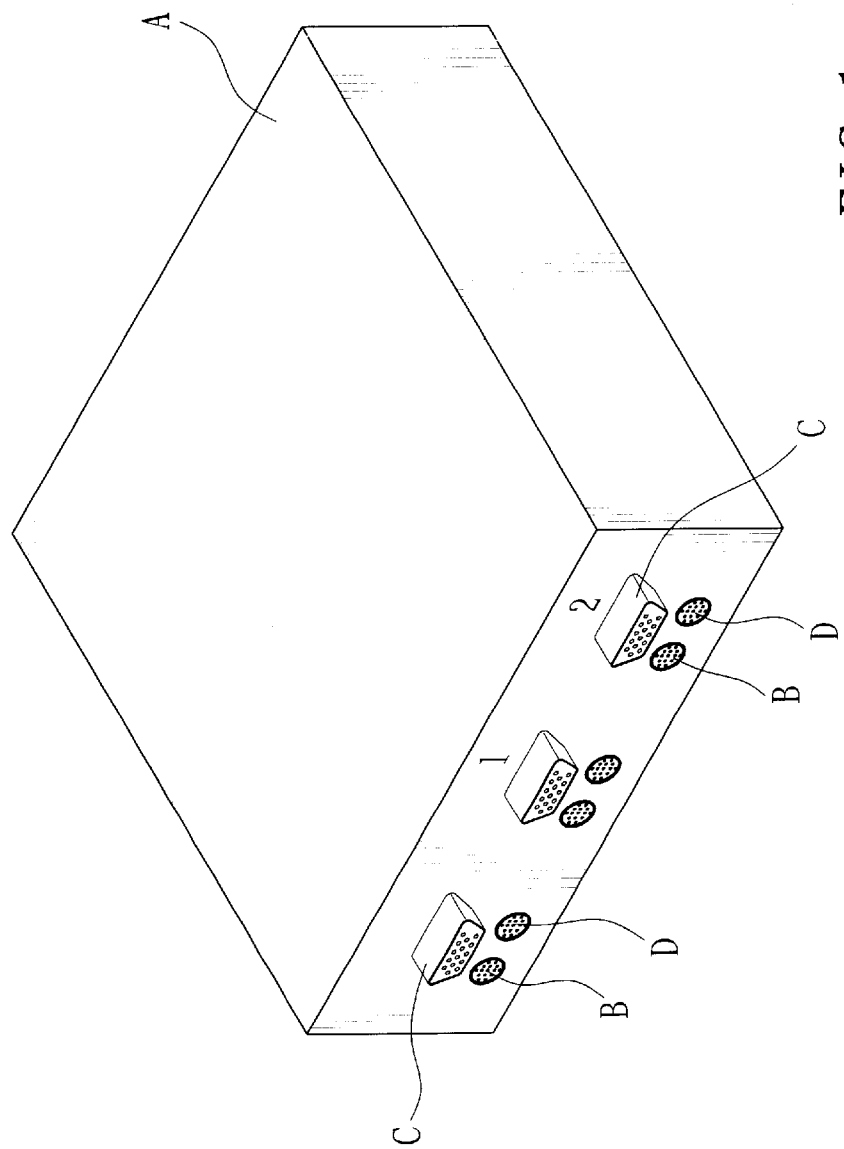
FIG. 1 is a perspective view showing a conventional KVM switch.

Accordingly, the built-in KVM switch of the present invention can be arranged in a host, as described. The connecting wire 5 is connected to the connector 4 at one end and to external peripherals at the other end, respectively. Obviously, the present invention provides a built-in KVM switch that is more convenient than the conventional external KVM switch because the housing (as shown in FIG. 1) of the conventional KVM switch is omitted, resulting in less space and manufacturing cost.

Figure 4:
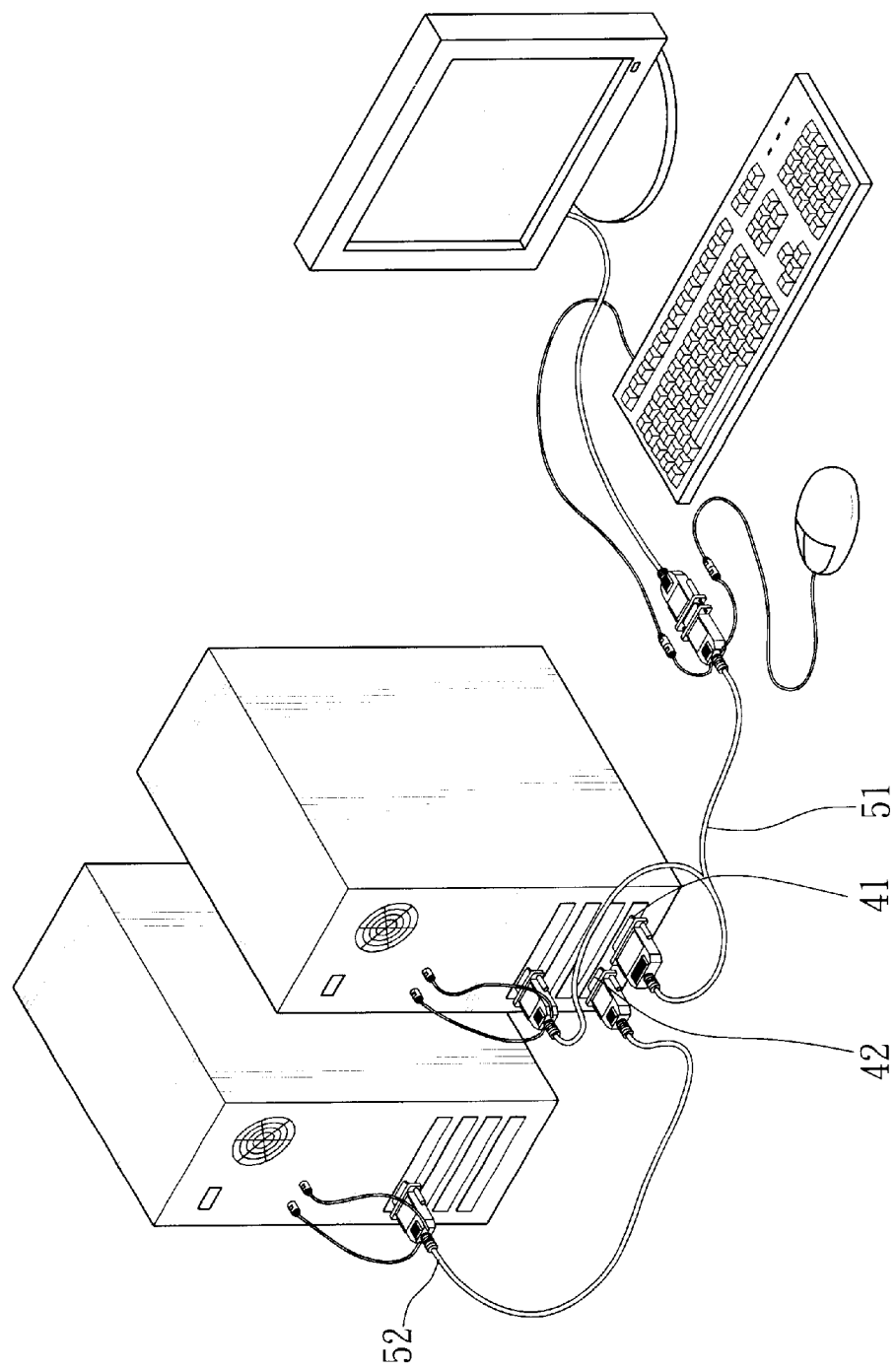
FIG. 4 is a perspective view showing a preferred embodiment of the present invention.

Please further refer to FIG. 4, which is a perspective view showing a preferred embodiment of the present invention. In this case where two computers are used, there are two connectors 41 and 42, with 25 pins and 15 pins respectively, disposed on the built-in KVM switch. More particularly, the 25-pin connector 41 receives a first connecting wire 51 having two KVM connector sets, one of which is connected to a keyboard, a video display and a mouse while the other is connected to a plug disposed on the back of a computer. On the other hand, the 15-pin connector 42 receives a second connecting wire 52 having one KVM connector set, which is connected to a plug disposed on the back of the other computer.

It is clear that, in the present invention, the number of various connectors is significantly reduced by re-defining the functions of the pins using the logic control unit, which is easily and fixedly attached onto the card in the host. Therefore, the manufacturing cost is reduced and the problem in that the connecting wires are arranged messy is overcome.

In the present invention, the logic control unit 3 is powered by the power from the connector for the keyboard or the mouse. When the built-in KVM switch is inserted into the augmentation socket in the host, it is independent of the host without any contact. Therefore, the present invention is free of any incompatibility issue.

Figure 5:
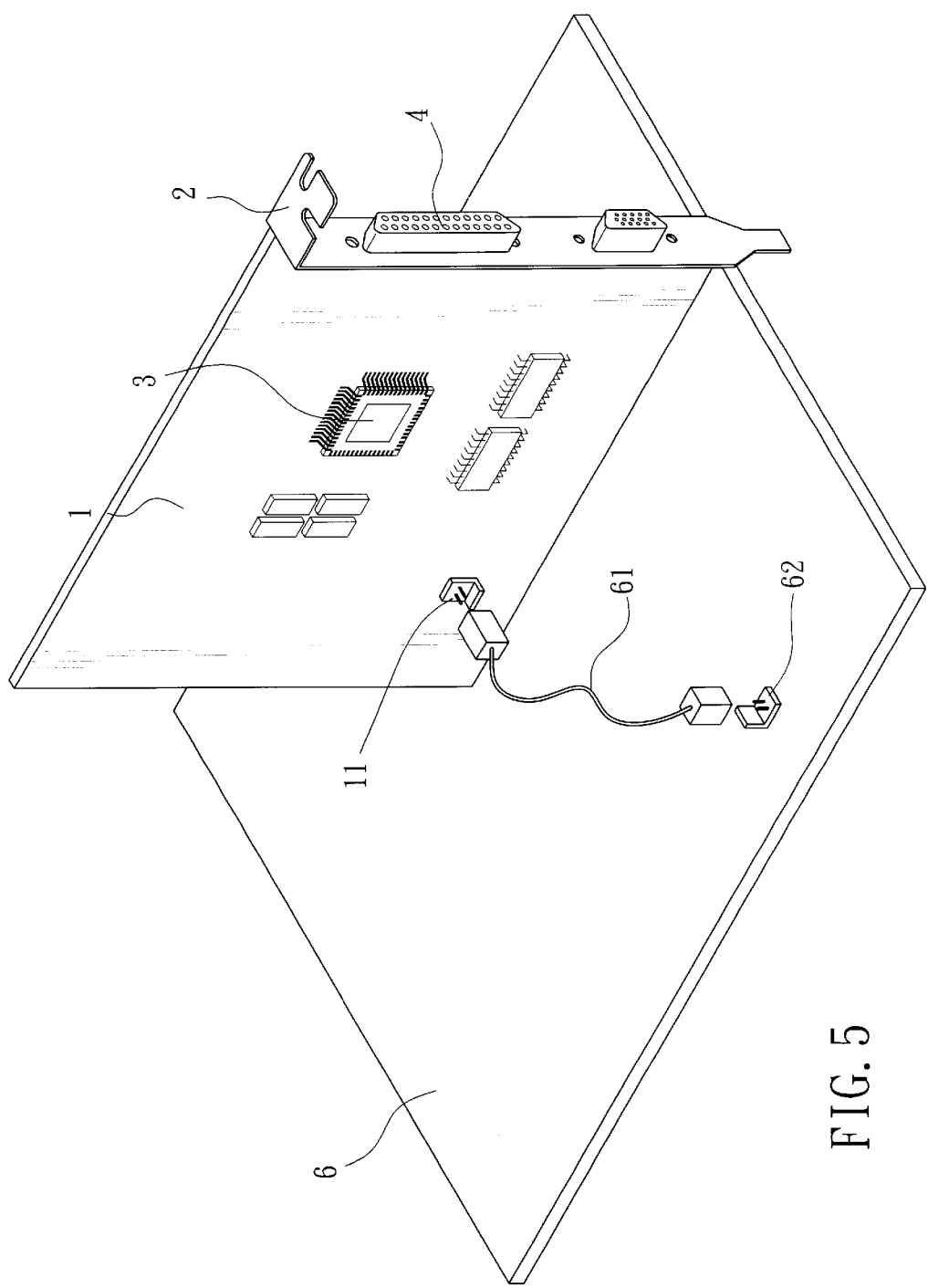
FIG. 5 is a perspective view showing another preferred embodiment of the present invention.

The present invention is applicable not only to the foregoing structure but also to various allocators such as video allocators, keyboard allocators, mouse allocators, etc. In this case, the connectors for the keyboard and the mouse also provide power, therefore there is no need for extra power supply for these peripherals. Considering a video allocator, however, the connector for the video display does not provide power, therefore a conventional external video display needs a power supply device. In another embodiment of the present invention, as shown in FIG. 5, a power outlet 11 for supplying power to the logic control unit 3 is disposed on the card 1. The power outlet 11 can be either coupled to a 12-V power plug from the power supply of the host or connected through a power wire 61 to a power outlet 62 on the motherboard 6.

According to the above discussion, the present invention discloses a built-in KVM switch fixedly coupled to an augmentation socket in a host so as to reduce the space and the amount of connectors required for peripherals and also to overcome the problem that the connecting wires are arranged messy. Therefore, the present invention has been examined to be novel, unobvious and useful.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A built-in KVM switch, comprising:

a card;

a fixing support, fixedly coupled to one side of said card and having at least one opening, inserted into an augmentation socket in a host;

at least one connector, disposed in said opening on said fixing support;

at least one connecting wire corresponding to said connector connected to said connecting wire at one end; and a logic control unit, disposed on said card so as to process a signal from said connector.

2. The built-in KVM switch as recited in claim 1, wherein said fixing support is L-shaped.

3. The built-in KVM switch as recited in claim 1, wherein said connecting wire is connected to said connector at one end, while said connecting wire, at the other end, is branched into three connectors/plugs to be connected to a mouse, a keyboard and a video display, respectively.

4. The built-in KVM switch as recited in claim 1, wherein said card is a printed circuit board.

5. The built-in KVM switch as recited in claim 1, wherein on said card is proved a power outlet for supplying power to said logic control unit.

6. The built-in KVM switch as recited in claim 5, wherein said power outlet receives a 12-V power plug from a power supply of said host.

7. The built-in KVM switch as recited in claim 5, wherein said power outlet is connected through a power wire to a power outlet disposed on a motherboard of said host.

* * * * *